US012795803B2

(12) United States Patent
Pan

(10) Patent No.: US 12,795,803 B2
(45) Date of Patent: Nov. 10, 2026

(54) HYPER WIRELESS CONTROLLED LIGHT SYSTEM

(71) Applicant: Everstar Merchandise Co., Ltd., Hung Hom Kowloon (HK)

(72) Inventor: Kuo-An Pan, Hung Hom Kowloon (HK)

(73) Assignee: Everstar Merchandise Co., Ltd., Hung Hom Kowloon (HK)

(*) Notice: Subject to any disclaimer, the term of this patent is extended or adjusted under 35 U.S.C. 154(b) by 74 days.

(21) Appl. No.: 19/049,470

(22) Filed: Feb. 10, 2025

(65) Prior Publication Data

US 2026/0040423 A1 Feb. 5, 2026

Related U.S. Application Data

(60) Provisional application No. 63/678,101, filed on Aug. 1, 2024.

(51) Int. Cl.
*H05B 47/19* (2020.01)

(52) U.S. Cl.
CPC .................................... *H05B 47/19* (2020.01)

(58) Field of Classification Search
USPC ......................................................... 340/4.62
See application file for complete search history.

(56) References Cited

U.S. PATENT DOCUMENTS

2007/0211466 A1* 9/2007 Pan .......................... F21S 4/10
362/249.16
2007/0291341 A1* 12/2007 Pan .......................... G02B 5/32
359/15
2008/0180034 A1* 7/2008 Pan ..................... F21V 23/0407
315/185 S
2009/0122538 A1* 5/2009 Pan ......................... F21V 5/002
362/235
2009/0213578 A1* 8/2009 Pan ........................... F21V 5/06
362/124
2023/0299987 A1* 9/2023 Yao ......................... H04L 12/18
370/389

FOREIGN PATENT DOCUMENTS

CN 211831277 U * 2/2020

* cited by examiner

*Primary Examiner* — Omar Casillashernandez
(74) *Attorney, Agent, or Firm* — Womble Bond Dickinson (US) LLP

(57) ABSTRACT

A lighting control system, power controllers, lighting controllers, LED light strings and control thereof, a hyper wireless control system, and further aspects are described herein. A technological method performed by an LED light string system with wireless communication among power controllers is described. A technological method performed by a power controller in an LED light string system with wireless communication among power controllers is described. In the system, a broadcast packet is forwarded, and a new signal source is formed, when the interval between reception times of two received broadcast packets is not less than a preset value or the two received broadcast packets are not identical. Forwarding is stopped, when the interval between reception times of two received broadcast packets is less than a preset value and the two received broadcast packets are identical. The system controls LED strings in accordance with broadcast packets.

20 Claims, 13 Drawing Sheets

HYPER WIRELESS CONTROLLED LIGHT SYSTEM

CROSS-REFERENCE TO RELATED APPLICATION

This application claims benefit of priority from U.S. Provisional Application No. 63/678,101 titled "Hyper Bluetooth Controlled Light System", filed Aug. 1, 2024.

INCORPORATION BY REFERENCE

The disclosure of U.S. Provisional Application No. 63/678,101 titled "Hyper Bluetooth Controlled Light System", filed on Aug. 1, 2024, is hereby incorporated by reference for all purposes as if set forth in its entirety.

TECHNICAL FIELD

The technical field of the present disclosure relates to wireless communication, lighting controllers, and lighting systems.

BACKGROUND

Lighting systems with light strings and controllers (herein specifically referred to as lighting controllers) have long made use of incandescent light strings and now increasingly use LED (light emitting diode) light strings. Conventionally, multiple LED light strings may be connected in series to a lighting controller, typically in greater numbers than is possible with incandescent light strings.

Nonetheless, this limits the lighting displays so constructed to arrangements with wired connections, which may make infeasible larger displays, or arrangements that span a larger structure or span multiple structures. Even wireless communication between a wireless communication device and a wireless controller may be limited by distance, e.g., for near field wireless communication such as Bluetooth® (registered trademark), which may limit displays constructed with wireless communication to a wireless controller employed as a lighting controller. As consumer, designer, and manufacturer interests drive technological innovation in lighting displays, there is a need in the art for a solution which overcomes the challenges described above.

SUMMARY

Embodiments of a lighting control system, power controllers, lighting controllers, LED light strings and control thereof, a hyper Bluetooth® control system, and further aspects are described herein. A technological method performed by an LED light string system with wireless communication among power controllers is described. A technological method performed by a power controller in an LED light string system with wireless communication among power controllers is described.

According to one aspect, the disclosure is generally directed to a lighting control system comprising a plurality of LED strings, a plurality of power controllers for controlling the plurality of LED strings in accordance with broadcast packets communicated among the plurality of power controllers and the plurality of power controllers configured to perform a technological method using wireless communication, comprising determining whether an interval between reception times of two received broadcast packets is less than a preset value determining whether the two received broadcast packets are identical, determining to forward a broadcast packet and form a new signal source, when the interval between the reception times of the two received broadcast packets is not less than the preset value or the two received broadcast packets are not identical, and determining to stop forwarding the broadcast packet, when the interval between the reception times of the two received broadcast packets is less than the preset value and the two received broadcast packets are identical.

In some example implementations, at least a subset of such broadcast packets each have a multilayer address, a function instruction and an LED string control instruction.

In some example implementations, the system further comprises the plurality of power controllers being configured to receive a broadcast packet from a signal source of a handheld device comprising a mobile device, a handheld controller or a mobile phone.

In some example implementations, the system further comprises the plurality of power controllers being configured to communicate via hyper wireless communication without handshake.

In some example implementations, the system further comprises the plurality of power controllers being configured to control at least one virtual group power controller comprising multiple power controllers grouped together with addressing-based collaborative control.

In some example implementations, the system further comprises the plurality of power controllers being configured to control the plurality of LED light strings with resetting synchronization for timers.

In some example implementations, the system further comprises each of the plurality of power controllers being configured to perform a technological method, comprising receiving broadcast packets that include addressing and function instruction for LED string control determining whether a condition is true that there is less than a preset time interval between two most recent received broadcast packets and the two most recent received broadcast packets are identical, forming a signal source state and forwarding the most recent received broadcast packet, when the condition is false, forming a standby state and stopping forwarding, when the condition is true; and controlling a respective one or more of the plurality of LED strings in accordance with such received broadcast packets.

According to another aspect, the disclosure is generally directed to a technological method, performed by a plurality of power controllers of a lighting control system using wireless communication and broadcast packets, comprising determining whether an interval between reception times of two received broadcast packets is less than a preset value, determining whether the two received broadcast packets are identical, determining to forward a broadcast packet and form a new signal source, when the interval between the reception times of the two received broadcast packets is not less than the preset value or the two received broadcast packets are not identical, determining to stop forwarding the broadcast packet, when the interval between the reception times of the two received broadcast packets is less than the preset value and the two received broadcast packets are identical, and controlling a plurality of LED strings in accordance with the broadcast packets using the wireless communication in the lighting control system.

In some example implementations, at least a subset of such broadcast packets each have a multilayer address, a function instruction and an LED string control instruction.

In some example implementations, the technological method further comprises receiving a broadcast packet from a signal source of a handheld device comprising a mobile device, a handheld controller or a mobile phone.

In some example implementations, the technological method further comprises using hyper wireless communication without handshake.

In some example implementations, the technological method further comprises using addressing-based collaborative control for at least one virtual group power controller comprising multiple power controllers grouped together.

In some example implementations, the technological method further comprises using resetting synchronization for timers in controlling the plurality of LED strings.

In some example implementations, each of the power controllers of the lighting control system using wireless communication and broadcast packets is configured to perform a technological method, comprising receiving broadcast packets that include addressing and function instruction for LED string control, determining whether a condition is true that there is less than a preset time interval between two most recent received broadcast packets and the two most recent received broadcast packets are identical, forming a signal source state and forwarding the most recent received broadcast packet, when the condition is false, forming a standby state and stopping forwarding, when the condition is true, and controlling a respective one or more of the plurality of LED strings in accordance with such received broadcast packets.

According to another aspect, the disclosure is generally directed to a tangible, non-transitory, computer-readable media having instructions thereupon which, when executed by a processor, cause the processor to perform a method comprising determining whether an interval between reception times of two received broadcast packets is less than a preset value, wherein the processor and such broadcast packets are in a lighting control system using wireless communication, determining whether the two received broadcast packets are identical, determining to forward a broadcast packet and form a new signal source, when the interval between the reception times of the two received broadcast packets is not less than the preset value or the two received broadcast packets are not identical, determining to stop forwarding the broadcast packet, when the interval between the reception times of the two received broadcast packets is less than the preset value and the two received broadcast packets are identical, and controlling a plurality of LED strings in accordance with such broadcast packets.

In some example implementations, at least a subset of such broadcast packets each have a multilayer address, a function instruction and an LED string control instruction.

In some example implementations, the method further comprises using hyper wireless communication without handshake.

In some example implementations, the method further comprises using addressing-based collaborative control for at least one virtual group power controller.

In some example implementations, the method further comprises using resetting synchronization for timers in controlling the LED strings.

In some example implementations, the method further comprises, for each of a plurality of power controllers of the lighting control system using wireless communication, receiving broadcast packets that include addressing and function instruction for LED string control, determining whether a condition is true that there is less than a preset time interval between two most recent received broadcast packets and the two most recent received broadcast packets are identical, forming a signal source state and forwarding the most recent received broadcast packet, when the condition is false, forming a standby state and stopping forwarding, when the condition is true, and controlling a respective one or more of the plurality of LED strings in accordance with such received broadcast packets.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
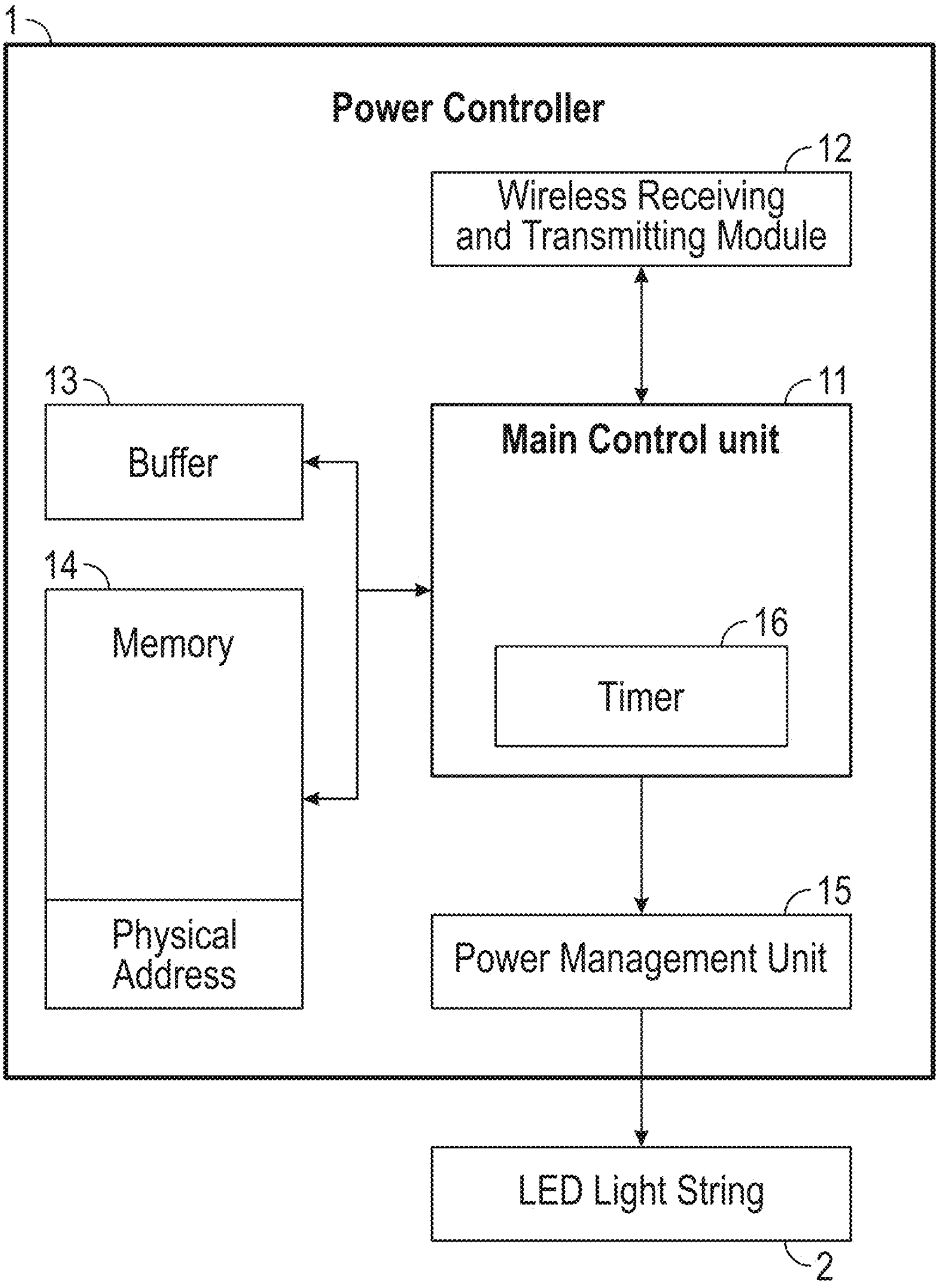
FIG. 1A illustrates an embodiment of a power controller and LED light string, which can be itself a lighting system and may also be coupled with further power controllers and LED light strings in a lighting system that has wireless communication.

Described herein are embodiments of lighting systems, lighting control systems, power controllers for LED light strings, and LED light string systems that use wireless communication and present technological solutions to the technological problem(s) of distance or separation limitation faced by wired and wireless controllers in such systems. These technological solutions address issues of coordination, synchronization, communication efficiency, establishment of distributed communication connections, resetting, group and individual control, and communication reliability in a wireless communication distributed control lighting system. Variations and further embodiments, with various combinations of the features and implementations described herein, are readily devised in keeping with the teachings herein. Application scenarios for the various embodiments include lighting displays in streets, courtyards, building external walls, and other places or structures which may be indoors or outdoors, using LED light strings for decorative or other implementations of illumination.

Typically, an LED light string system includes a power controller and an LED light string connected in series to the power controller. The power controller is a control circuit for converting alternating current (AC) to direct current (DC) supplied to the LED light strings. Also, the power controller typically includes a processor, microprocessor, microcontroller, etc. and programming for controlling the LED light string, which may for example be with on, off, brightness, color change, and/or effects such as twinkle, fade, chase, etc.

Because brightness of an LED string may decrease when the LED light string exceeds a certain length, and there may be limits to the number of LED strings that can be connected in series without such losses. Accordingly, it may be advantageous to have multiple power controllers and wireless communication among the power controllers for greater possibilities of arrangements of LED strings, especially in larger or distributed, multiple structures environments and displays. In this case, how to realize collaborative control or independent control of the LED light strings by the power controllers is a problem to be solved.

In some systems, a communication control circuit is added to each power controller to perform communication between two or more power controllers. This realizes point-to-point transmission control, as follows. After receiving a signal, one power controller establishes a communication connection with an adjacent power controller, generally by shaking hands, i.e., executing a handshake protocol (broadly, "first handshake"). After the handshake protocol, the first power controller transmits the control signal to the adjacent power controller (broadly, "second handshake"), then the adjacent power controller repeats the action of the first power controller to transmit the signal to the next power controller (broadly, "third handshake"). In this way, linkage control of multiple LED light strings, each with its own power controller, can be realized. Specific structures for linkage control between the power controllers may be connected by wired communication, or wireless communication such as 2.4 G or 5G, wireless protocols, and/or Bluetooth® protocols.

Some embodiments described herein adopt a hyper wireless mode. By eliminating the connection based on wireless communication with three handshakes, any data packets in conformity with wireless signals can be received. By such a communication method, a wireless signal can be transmitted and received within the coverage range of the wireless signal. For example, one power controller sends the same signal 50 times within one or 2 ms, by a hyper wireless chip, e.g. a 2.4 G communication chip or a simplified Bluetooth® chip, and all hyper wireless chips of other power controllers within the coverage range of the wireless signal can receive a data packet of the wireless signal without the usual establishing of a multiple handshake-based connection.

Further, in various embodiments, when continuously receiving and analyzing the wireless signal, if a message header and message trailer of the analyzed data packet are identical with a prestored message header and message trailer, the data packet will be stored. On the other hand, if the message header and message trailer of the analyzed data packet are different from the prestored message header and message trailer, the data packet will not be stored. Using this mechanism, interference signals, e.g., wireless signals not associated with the intended control of an LED light string, are eliminated. After two data packets are successively stored, if the contents in the first data packet are the same as those in the second data packet, a control signal will be output to a control unit of the power controller, and subsequent data packets will not be stored. After that, the control unit controls an LED light string connected to the power controller, according to the first data packet. For example, the control unit could turn the LED light string on or off, execute a lighting effect, etc.

While using wireless communication among the power controllers, various embodiments may receive user input for controlling LED light strings through various mechanisms. Some embodiments have control buttons on a case of the power controller. Some embodiments can be controlled through wireless communication from a handheld device such as a mobile phone or a wireless equipped power controller. Some embodiments have multiple kinds of input, including embodiments that have control buttons on a case of a power controller and can also be controlled from a handheld device through wireless communication, embodiments that can be controlled from multiple handheld devices through wireless communication, and embodiments that have control buttons on a case of a power controller and can also be controlled from multiple handheld devices through wireless communication.

FIG. 1A illustrates an embodiment of a power controller 1 and LED light string 2, which can be itself a lighting system and may also be coupled with further power controllers and LED light strings in a lighting system that has wireless communication. The power controller 1 has a main control unit 11, which could be a processor, controller, microcontroller, etc., a wireless receiving and transmitting module 12, which could be Bluetooth® or other wireless in various embodiments, a buffer 13, a memory 14, and a power management unit 15. The memory 14 is used, among other functions, for storing a unique physical address of the power controller 1. That is, in some embodiments, it is desirable for each power controller 1 in a lighting system with multiple power controllers, to have its own unique physical address so as to support individual power controller addressing in the system.

The power management unit 15 is connected to the main control unit 11 and to the LED light string 2, and the main controller unit 11 controls the power management unit 15 to realize control of the LED light string 2, e.g., for on, off, lighting effects, etc. The LED light string 2 may be formed by LED lamp beads connected in series or parallel, or with corresponding wiring for color change of white, one or more selected colors, RGB, bi-color, and/or otherwise-configured LEDs, etc. For examples, see FIGS. 1B, 1C, 1D.

The wireless receiving and transmitting module 12 is used for receiving broadcast packets with the appropriate identifier. Under control of the main control unit 11, broadcast packets are stored in the buffer 13, the physical address in the memory 14 is read into the buffer 13, and target addresses in the broadcast packets are compared with the physical address to determine whether the addresses are the same, in various embodiments. A timer 16 is herein shown as integral with the main control unit 11, but could be implemented separately in further embodiments. In some embodiments, a time and counter are installed in a program in the memory 14, to realize timing control and counting control.

Figure 1B:
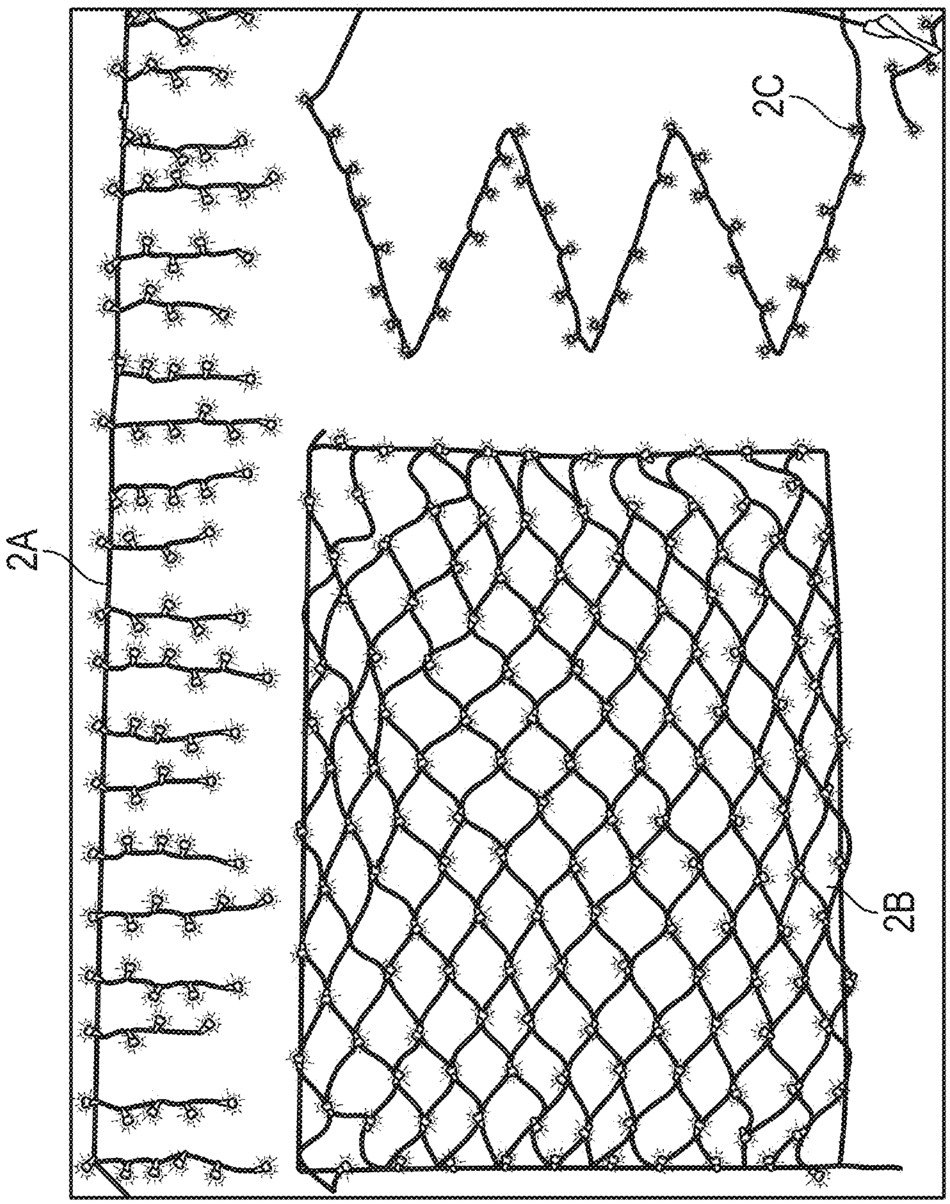
FIG. 1B illustrates an embodiment of a light string, suitable for use with the power controller and variations thereof.

FIG. 1B illustrates an embodiment of a light string 2, suitable for use with the power controller and variations thereof. One light string 2A has multiple LED light strings hanging down from overhead wires, in what may be termed an LED icicle light string. One light string 2B has LEDs in a mesh arrangement, in what may be termed an LED mesh. One light string 2C has LEDs in a linear arrangement, in what may be termed an LED string or a basic type thereof.

Figure 1C:
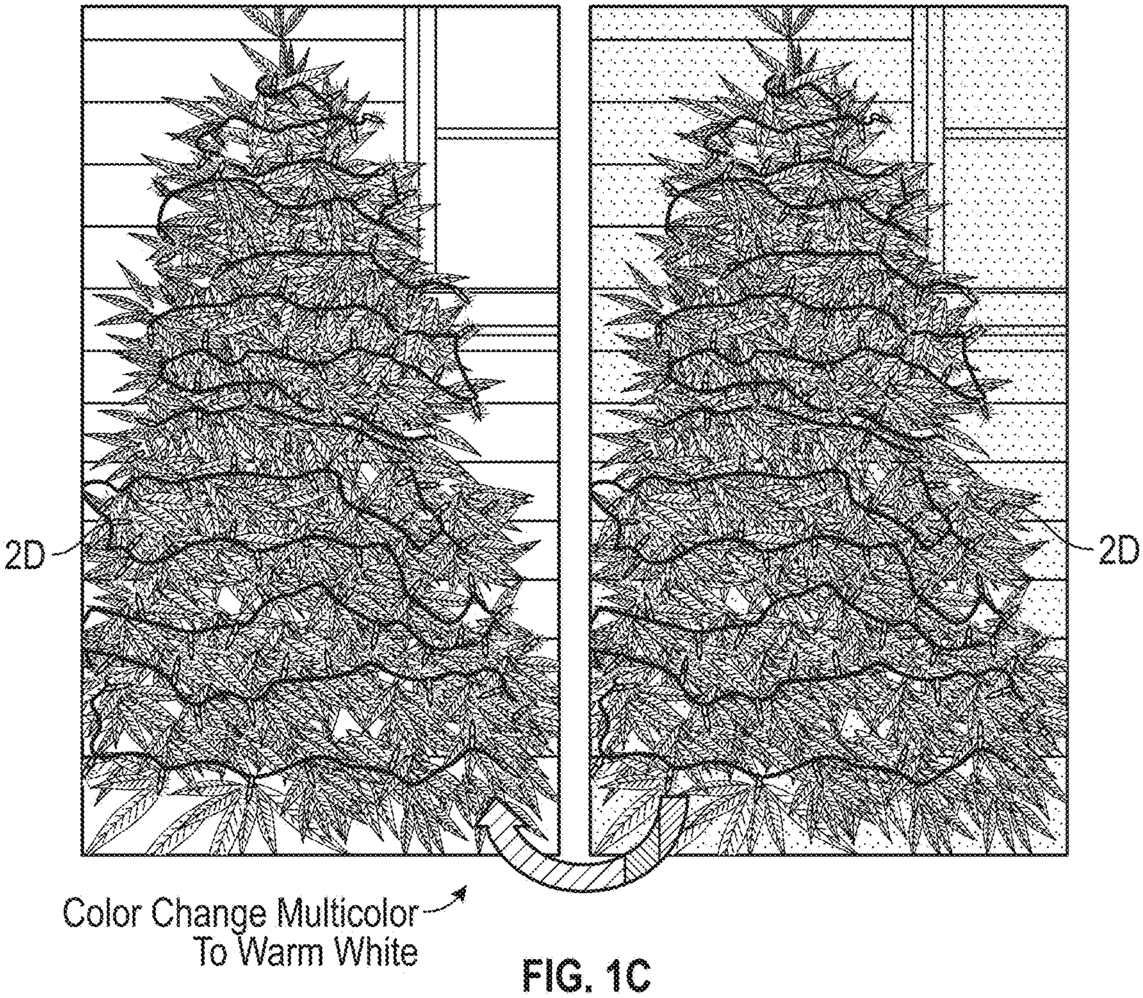
FIG. 1C illustrates an embodiment of a light string, suitable for use with the power controller and variations thereof.

FIG. 1C illustrates an embodiment of a light string 2, suitable for use with the power controller and variations thereof. Here, the light string 2D is shown on the left as single color, and on the right as multicolor. It is understood the controller is controlling the light string 2D, to change color.

Figure 1D:
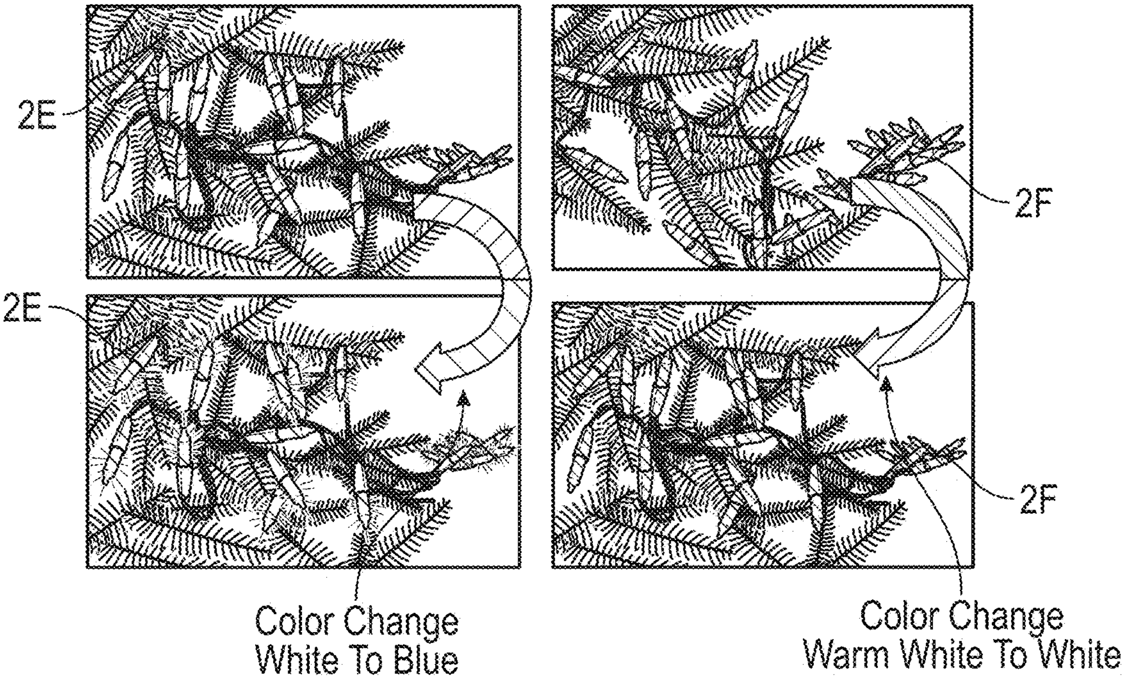
FIG. 1D illustrates an embodiment of a light string, suitable for use with the power controller and variations thereof.

FIG. 1D illustrates an embodiment of a light string 2, suitable for use with the power controller and variations thereof. On the left, the light string 2E is shown as changing from one color to another, top to bottom. On the right, the light string 2F is shown as changing from one color to another, top to bottom. It is understood the controller(s) are controlling the light strings 2E, 2F, to change color.

Figure 1E:
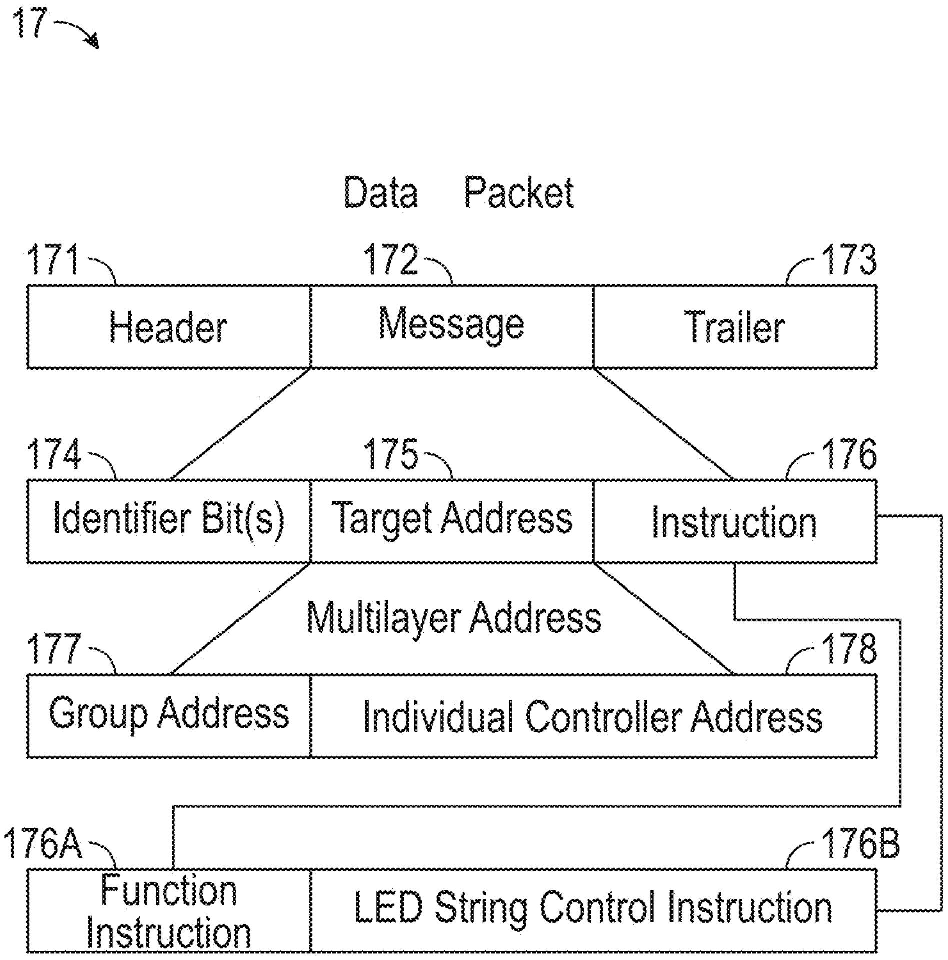
FIG. 1E illustrates an example data packet, suitable for use with the power controller and variations thereof, for wireless communication and control of LED light string(s).

FIG. 1E illustrates an example data packet 17, suitable for use with the power controller and variations thereof, for wireless communication and control of LED light string(s). Variations of data packets with fewer fields, different ordering, additional fields, or different naming conventions for the fields, are readily devised. Parsing the data packet 17 is as follows, for some embodiments. The data packet 17 has a header 171, which may also be termed a message header, a message 172, which may also be termed message contents, and a trailer 173, which may also be termed a message trailer.

The message 172 is composed of identifier bit(s) 174, which may also be termed an identifier (ID), a target address 175, which may also be termed an address or a physical address for a controller, and an instruction 176.

Figure 6:
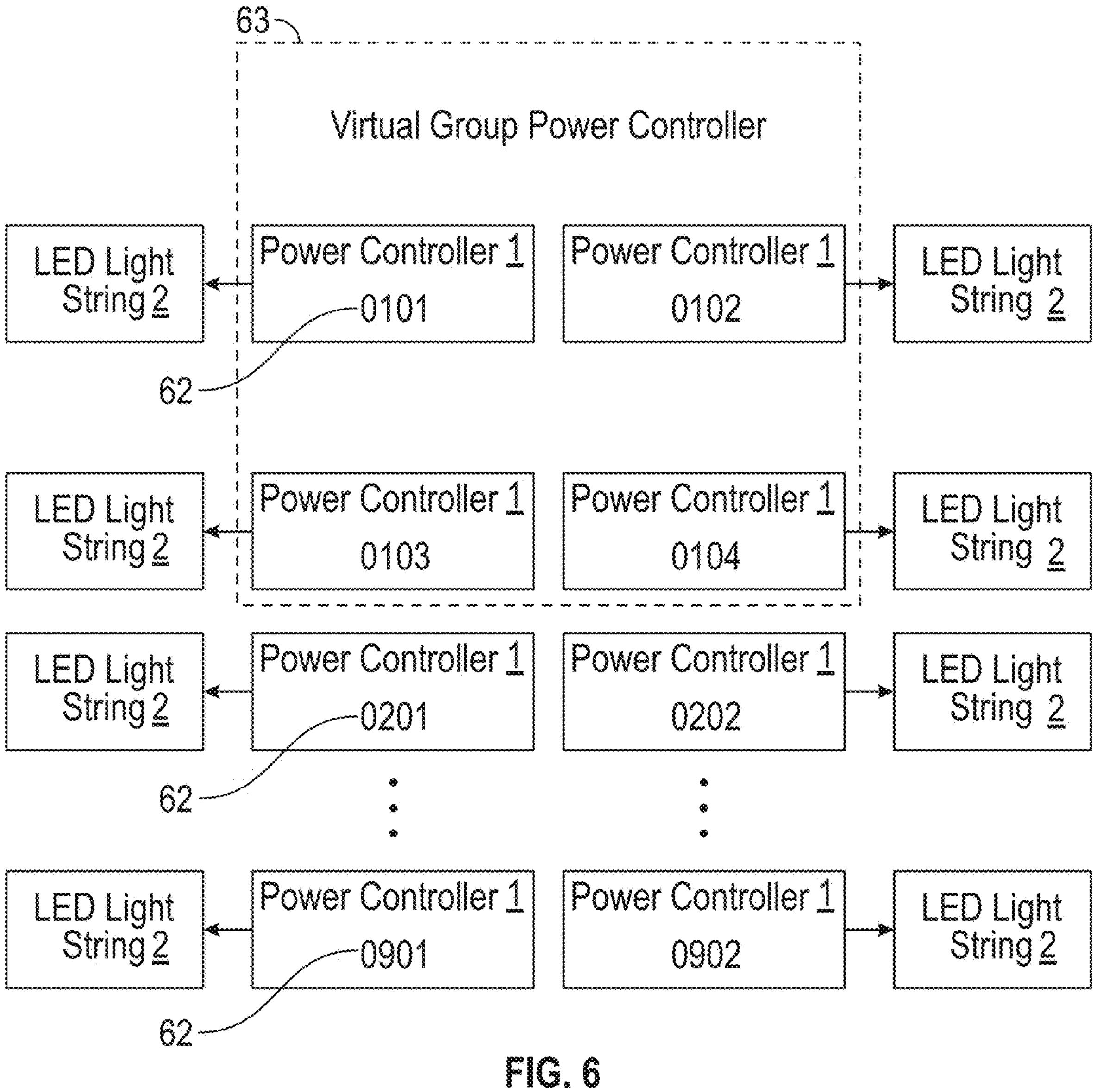
FIG. 6 illustrates an embodiment of an LED light string system with multiple power controllers that have wireless communication.

In some embodiments, the target address 175 is a multilayer address, composed of a group address 177 and an individual controller address 178 (see FIG. 6). In embodiments with multilayer address, the group address 177 addresses a group of power controllers, and the individual controller address 178 addresses a single controller.

In various embodiments, the instruction 176 may be decoded as a function instruction 176A or an LED string control instruction 176B, or may be decoded as both the function instruction 176A and the LED string control instruction 176B (e.g., one or both types of instructions in a given data packet).

Figure 2:
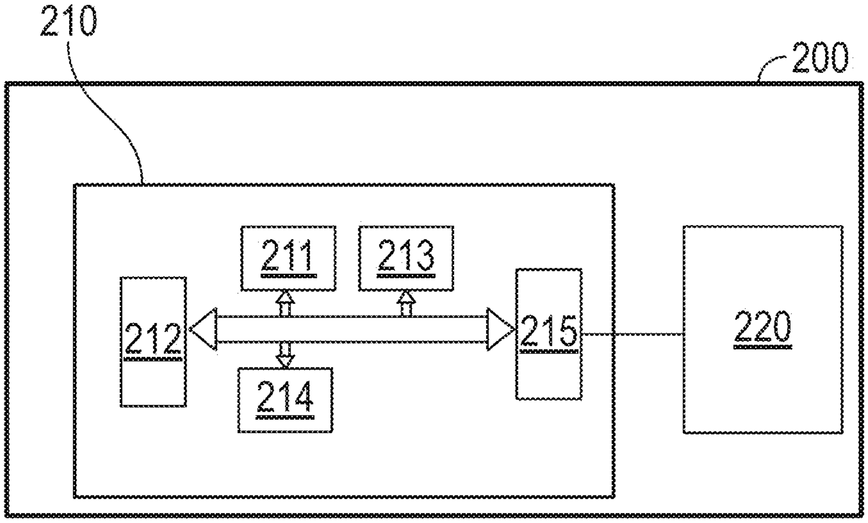
FIG. 2 illustrates an embodiment of a lighting controller featuring a hyper Bluetooth® control system for use in controlling an LED light string.
Figure 4:
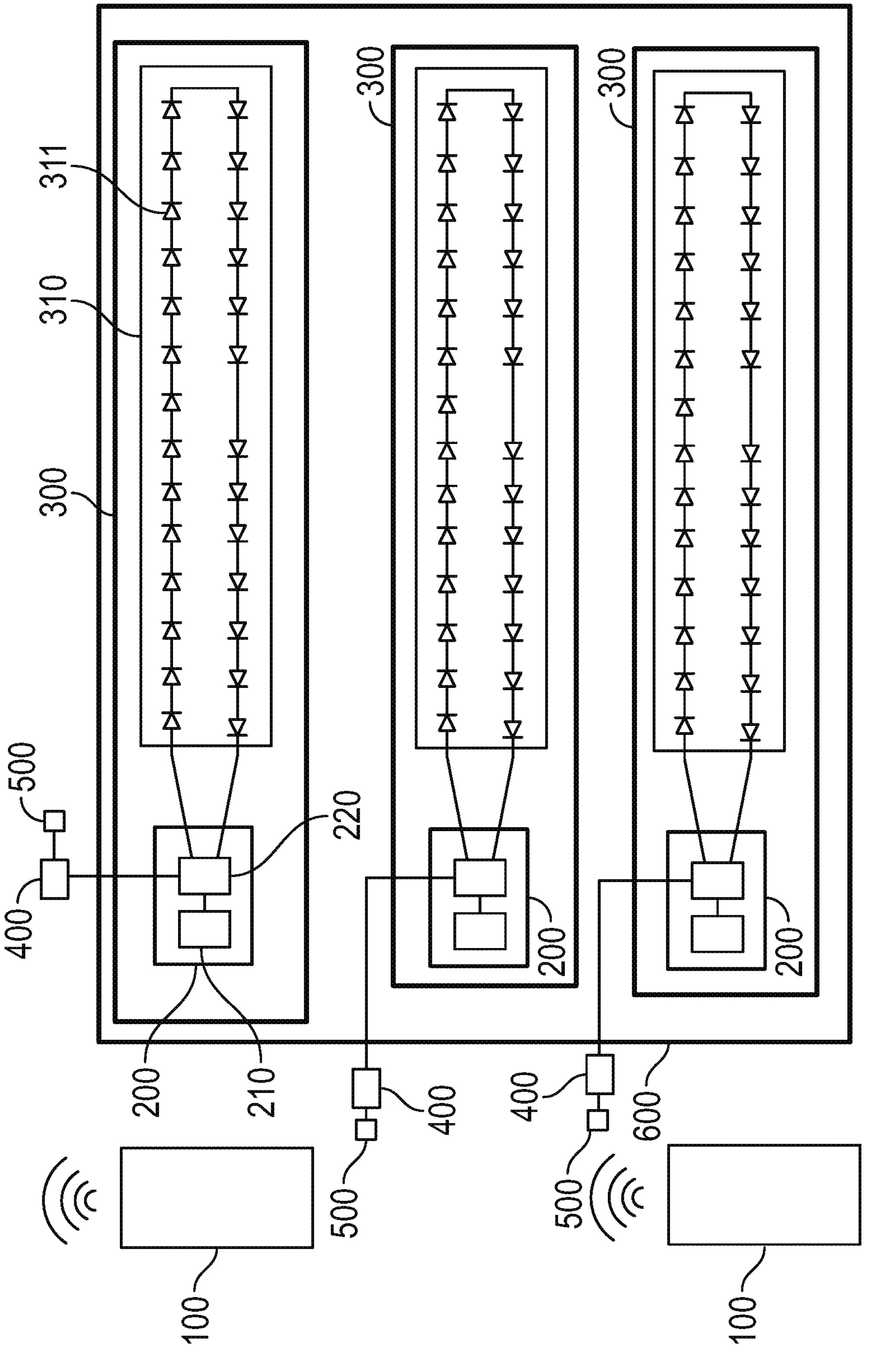
FIG. 4 illustrates an embodiment of a lighting system, with lighting controller and LED light string, which may be controlled by one or multiple handheld devices, which may be mobile phones.

FIG. 2 illustrates an embodiment of a lighting controller 200 featuring a hyper Bluetooth® control system for use in controlling an LED light string (see also FIG. 4). In variations, other types of wireless components, connection, protocols, etc. can be used. For example, one further embodiment has a Bluetooth® transmitter or Bluetooth® transceiver. The lighting controller 200, which may also be termed a hyper Bluetooth® control device, has a Bluetooth® signal receiver 210, a microprocessor 211 (or a controller, microcontroller, processor, etc.), a receiving unit 212, a storage unit 213, a comparator 214, an output interface 215, and a single-chip microcomputer 220. In some embodiments, the microprocessor 211 and microcomputer 220 could be combined, and various further embodiments with further components are understood.

Figure 3:
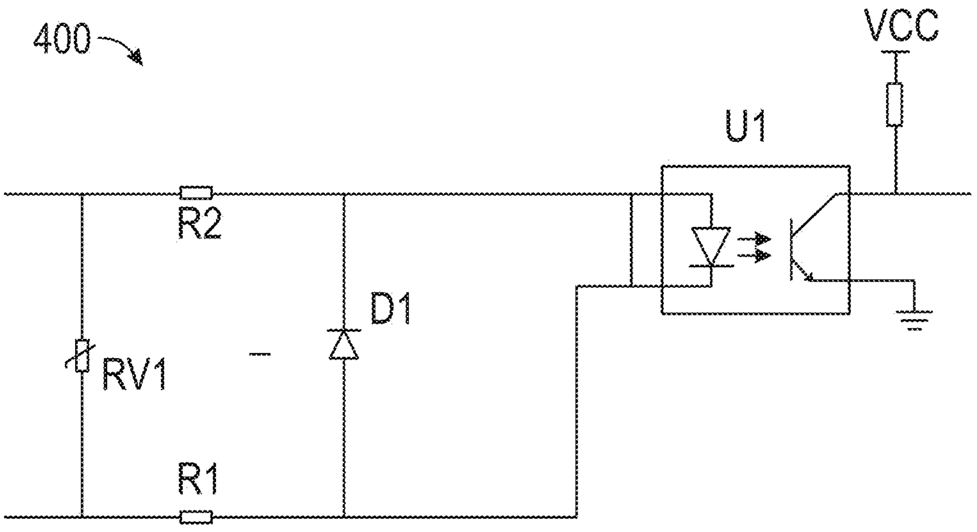
FIG. 3 illustrates an embodiment of a mains zero-crossing detection circuit, suitable for use in embodiments of power controllers, lighting control systems or lighting systems using LED light strings.

FIG. 3 illustrates an embodiment of a mains zero-crossing detection circuit 400, suitable for use in embodiments of power controllers, lighting control systems or lighting systems using LED light strings. The function of the mains zero-crossing detection circuit 400 is to detect zero-crossing of an AC voltage waveform, particularly of mains supply 500 (see FIG. 4) as typically delivered by an electric utility to a house or building, i.e., common AC power for household or commercial use.

In this embodiment, the mains zero-crossing detection circuit 400 shown in FIG. 3 is used and includes a piezoresistor RV1. Two terminals of the piezoresistor RV1 are respectively connected to a resistor R1 and a resistor R2 and then connected in parallel to positive and negative electrodes of a diode D1. The positive and negative electrodes of the diode D1 are connected to an input port of a photoelectric coupler U1, and an output port of the photoelectric coupler U1 is connected to the input terminal of the single-chip microcomputer 220 (see FIG. 2 and FIG. 4).

FIG. 4 illustrates an embodiment of a lighting system 600, with lighting controller 200 (as illustrated in FIG. 2) and LED light string 310, which may be controlled by one or multiple mobile phones or other handheld devices 100. One embodiment of lighting system 600 may be termed a hyper Bluetooth®-controlled light string group. The power controller 1 of FIG. 1A may be used in a further embodiment of a lighting system 600 with LED light string 310. In the lighting system 600, there is a group (i.e., multiple individual units grouped together) of lighting systems, in one embodiment each a hyper Bluetooth®-controlled light string 300. Each hyper Bluetooth®-controlled light string 300 has lighting controller 200, e.g., in one embodiment a hyper Bluetooth® control device, connected to an LED light string 310. Each lighting controller 200, e.g., a hyper Bluetooth® control device, has a Bluetooth® signal receiver 210 (or other wireless receiver in further embodiments), a single-chip microcomputer 220, and may also have further components as illustrated in FIG. 2.

Continuing in FIG. 4, the LED light string 310 is made of multiple LED lamp beads 311. Each lighting controller 200 is connected to a mains zero-crossing detection circuit 400, which is connected to a mains supply 500 (e.g., household or building AC power).

To facilitate control, in some embodiments a handheld device 100 (e.g., a mobile phone or a wireless equipped power controller, see also FIGS. 1A, 5A-5C) is used for control. In some embodiments, a customized app is installed in the mobile phone, a Bluetooth® wireless signal is sent by the app and mobile phone and received by one or more power controllers, e.g., hyper Bluetooth® control device or lighting controller 200 (see FIG. 4) or power controller 1 (see FIG. 1A), and LED light strings 310 connected to the power controllers are controlled. In some embodiments, power controller 1 sends a Bluetooth® wireless signal, which is received by one or more power controllers, and LED light strings 310 connected to the power controllers are controlled.

Continuing with the embodiment illustrated in FIG. 4 and with reference to FIGS. 1E, 2 and 3, a receiving unit 212 of the Bluetooth® signal receiver 210 receives the modulated Bluetooth® signal sent by the handheld device 100, and demodulates the signal. In one embodiment, the modulated Bluetooth® signal includes an address code signal and a control signal, such as included in a data packet 17 (see FIG. 1E), therein shown as data packet fields including identifier bit(s) 174, target address 175 and instruction 176. The receiving unit 212 of the Bluetooth® signal receiver 210 receives the modulated Bluetooth® signal including the corresponding address code signal and the control signal, and demodulates the corresponding address code signal and the control signal from the modulated Bluetooth® signal. A storage unit 213 stores a Bluetooth® address code. A comparator 214 processes the corresponding address code signal and the Bluetooth® address code. A microprocessor 211 transmits the control signal to the single-chip microcomputer 220 by means of an output interface 215 according to the processing result of the comparator 214. The single-chip microcomputer 220 controls the LED light string 310 according to the control signal.

In one embodiment there may be many hyper Bluetooth®-controlled light strings 300 (e.g., 3 or more, 100 or more, etc.) arranged to form a hyper Bluetooth®-controlled light string group or lighting system 600. The mobile phone or other handheld device 100 transmits (e.g., by radio) the modulated Bluetooth® signal including the corresponding address code signal and the control signal, and all of the hyper Bluetooth®-controlled light strings 300 within signal range can receive the modulated Bluetooth® signal, and demodulate the corresponding address code signal and the control signal, to control corresponding LED light strings 310. Accordingly, the need for one-to-one matching between handheld devices 100 and hyper Bluetooth®-controlled light strings 300 can be obviated, and the system can realize one-to-many light string control. That is, a single handheld device can address each of many hyper Bluetooth®-controlled light strings 300, in a hyper Bluetooth®-controlled light string group or lighting system 600. This allows the lighting system 600 to be controlled by means of one mobile phone or other handheld device 100.

With continued reference to FIG. 4, in some embodiments, multiple mobile phones or other handheld devices 100 can be used, for example when two or more users control the hyper Bluetooth®-controlled light string group or lighting system 600. Two such users (or more) with handheld devices 100 can send two modulated Bluetooth® signals (or more), each such signal including corresponding Bluetooth® address code signals and control signals. After receiving the modulated Bluetooth® signals, the hyper Bluetooth® control system for the hyper Bluetooth®-controlled light string group or lighting system 600 controls LED light strings 310 according to those Bluetooth® address code signals and control signals. In this way, a many-to-many control mode is realized. This allows the lighting system 600 to be controlled by means of two or more handheld devices 100.

Figure 5A:
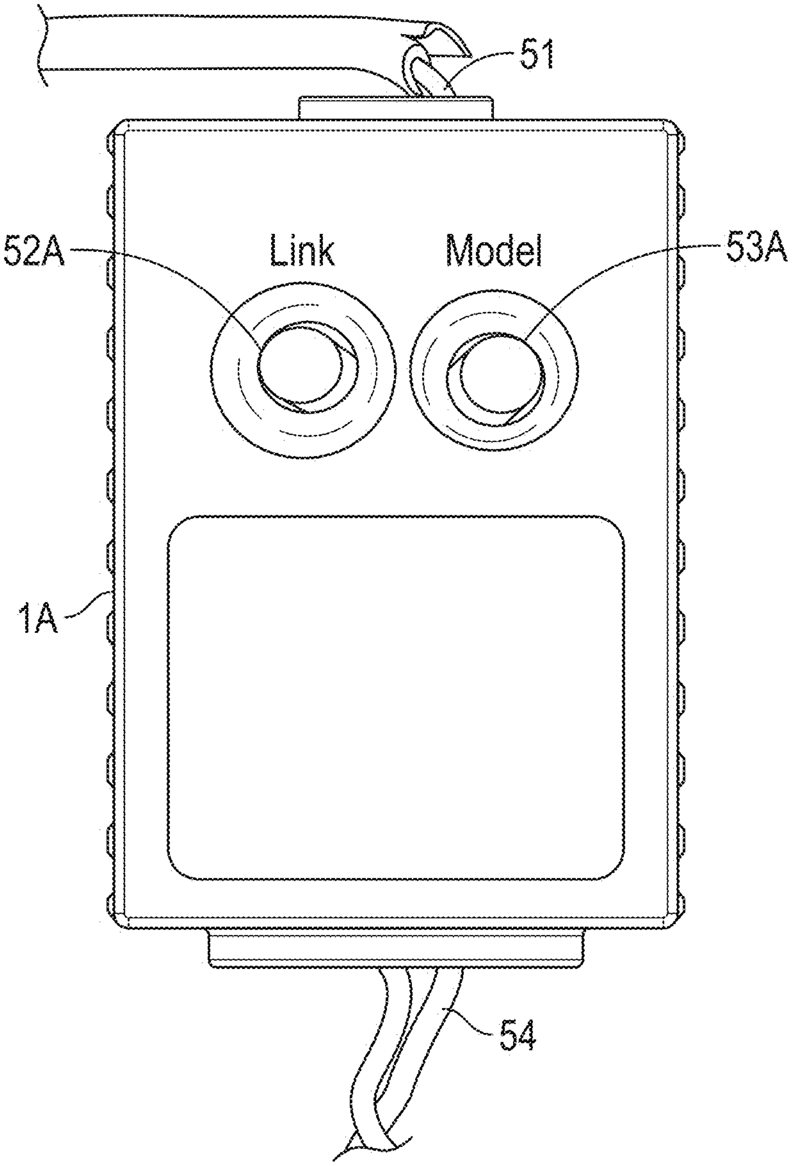
FIG. 5A illustrates an embodiment of a case and buttons of a power controller, suitable for use in embodiments of power controllers, lighting control systems or lighting systems.
Figure 5B:
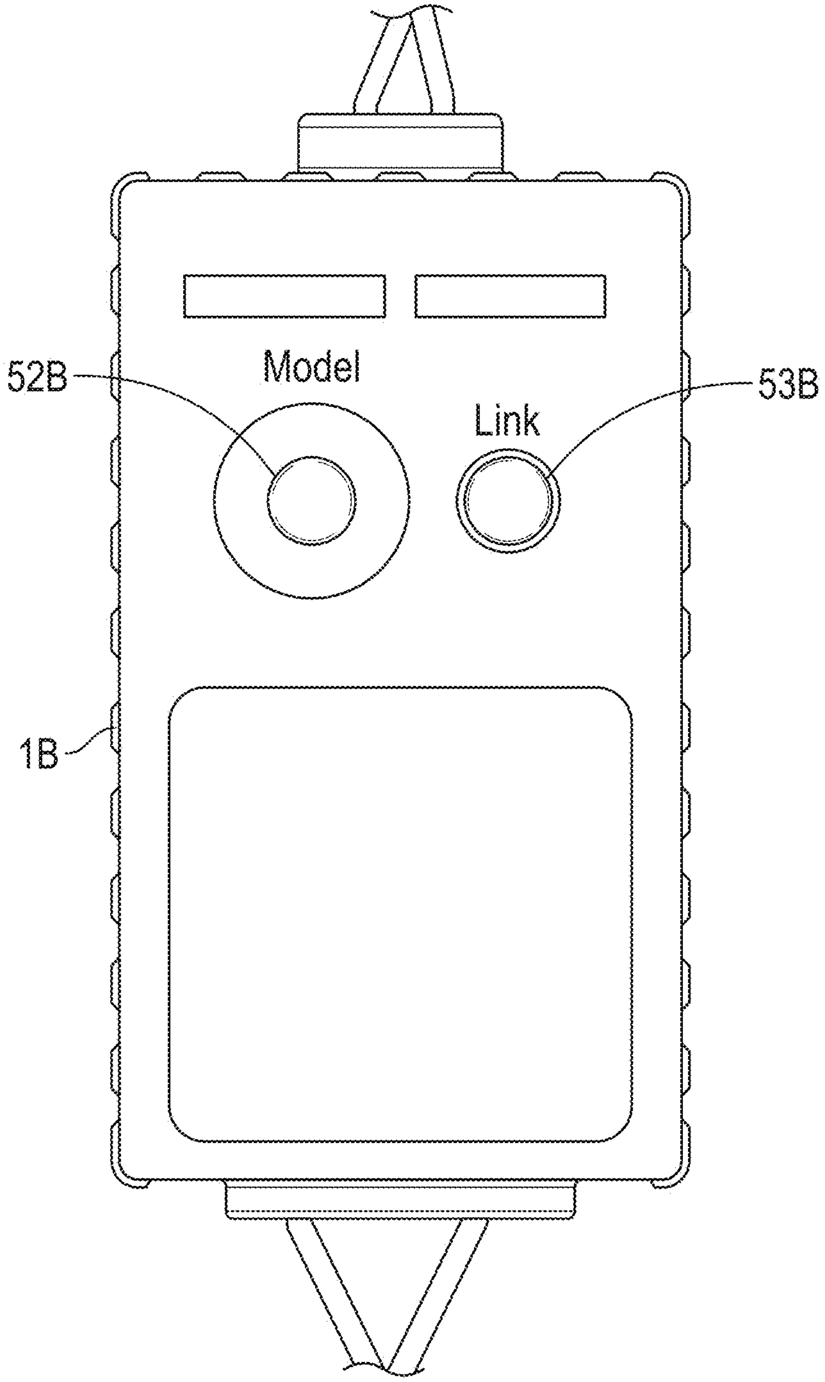
FIG. 5B illustrates an embodiment of a case and buttons of a power controller, suitable for use in embodiments of power controllers, lighting control systems or lighting systems.
Figure 5C:
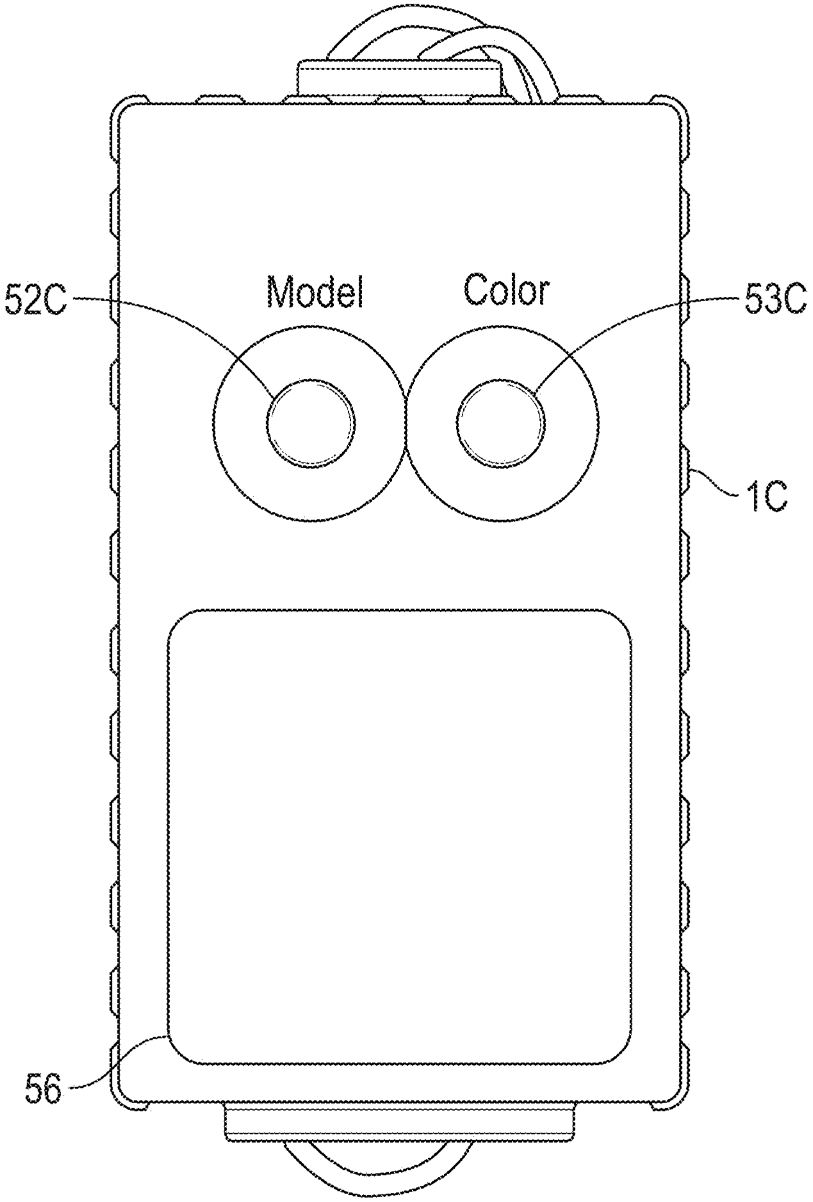
FIG. 5C illustrates an embodiment of a case and buttons of a power controller, suitable for use in embodiments of power controllers, lighting control systems or lighting systems.

With reference to FIG. 5A-5C, in some embodiments, user input is performed directly on each power controller, which may be considered a wired handheld device with respect to an LED light string connected to that power controller, and which may be considered a wireless handheld device in some embodiments with respect to wireless communication with other controllers as described with reference to FIG. 7-10. For user inputs directly performed on a power controller, the following embodiments of power controllers have buttons, e.g., on the case or housing of the power controller, and have control programs, e.g., software executing on a processor, firmware, hardware and combinations thereof, for various, e.g., same or different types of light strings and lighting effects.

FIG. 5A illustrates an embodiment of a case and buttons 52A, 53A of a power controller 1A, suitable for use in embodiments of power controllers, lighting control systems or lighting systems. Power wiring 51 is visible at the top of the case, and LED light string wiring 54 is visible at the bottom of the case. One button 52A can be labeled "LINK", and one button 53A can be labeled "MODEL". These buttons may be suitable for conventional bidirectional light strings with eight functions, and electrodeless bicolor light strings.

The LINK button 52A is used for function broadcasting and transmission to realize a function such as flickering, normally on, changing gradually, or waterfall (e.g., a chase sequence, or a rotation through a set of sequences or effects), etc. Also, the LINK button 52A can be used for synchronization of all light strings controlled by the power controller.

When the MODEL button 53A is pressed, function broadcasting and transmission are not performed, and only function switching of the power controller is implemented. That is, the MODEL button 53A controls whether the power controller 1A is performing broadcasting and transmission, or not, and whether the power controller 1A is controlling further light strings connected to further power controllers, which receive the function broadcasting and transmission, or is controlling only a light string connected to the power controller 1A and not performing broadcasting and transmission.

Thus, the arrangement of the power controller 1A can be such that control of one or more functions of the light string to which the power controller 1A is connected, e.g., through a wired connection, can be affected by the button 53A. Such control of the light string to which the power controller 1A is connected through wiring can also be affected by the button 53A, which can additionally synchronize all light strings within signal range to light under such function.

FIG. 5B illustrates an embodiment of a case and buttons of a power controller 1B, suitable for use in embodiments of power controllers, lighting control systems or lighting systems. Here, one button 52B is labeled "MODEL", and one button 53B is labeled "LINK". The power controller 1B can have a configuration and effect control of one or more light strings in a manner generally similar to that of the power controller 1A described above.

FIG. 5C illustrates an embodiment of a case and buttons of a power controller 1C, suitable for use in embodiments of power controllers, lighting control systems or lighting systems. In one version, the buttons can be illuminated, and illumination is selectable according to the state selected by the user. Here, one button 52C is labeled "MODEL" and can be provided with or without illumination. One button 53C is labeled "COLOR" and can be illuminated. For example, user selection and activation of illumination for the COLOR button 53C may correspond with user selection of color for control of bicolor LEDs, or color change or rotation color of RGB LEDs, in a light string. Other effects, operating modes, etc., may be selectable and indicated, in variations as readily devised.

In one embodiment, the controller 1C is started in a group control mode by default. In the case where a group control indicator light is on, e.g., via illumination of COLOR button 53C, this indicates that data broadcasting and transmission will be performed when either of the two buttons is pressed down.

If the MODEL button 52C is pressed, functional data will be broadcast and transmitted to realize a function and synchronization of all light strings controlled by the controller. If the COLOR button 53C is pressed, color data will be broadcast and transmitted to realize color (e.g., red, green, yellow, blue, cyan, purple, white) synchronization of all light strings controlled by the controller.

In the illustrated embodiment, if the two buttons 52C, 53C are pressed at the same time (e.g., both buttons pressed for a specified time duration), associated indicator lights can be turned off, and group control will be disabled. In this case, if either of the MODEL button 52C or the COLOR button 53C button is pressed, data will not be broadcast or transmitted, and only function switching or color switching of the light string to which the power controller 1C is connected via wired connection is implemented.

It will be understood that or more of the controllers 1A, 1B, 1C can be configured for default group control of multiple light strings by default in the manner described above, such as multi-use and colorful light strings, point-control light strings, or colorful synchronous light strings.

In some embodiments, a forwarding function is added to the wireless controller. For example, after receiving a signal, a power controller can forward the signal, such that the power controller can function as a new signal source. This forwarding function can be enabled and disabled, as further described below with reference to FIG. 1A, FIG. 1E and FIGS. 6-11A, and embodiments of power controller 1.

FIG. 6 illustrates an embodiment of an LED light string system with multiple power controllers 1 (see FIG. 1A) that have wireless communication. Each power controller also has a forwarding function. Each power controller 1 is connected to and controls a corresponding LED light string 2. Each power controller 1 is shown with a corresponding physical address 62, which is stored in memory 14 (see FIG. 1A) of the power controller 1. The forwarding function and the addressing scheme support various spaced apart arrangements of power controllers 1 and LED light strings 2, and various groupings of power controllers 1 and LED light strings 2 in such arrangements, including arrangements where not all of the power controllers 1 are within wireless range of a single power controller 1 or hand held device 100.

The forwarding function and the addressing scheme, in these embodiments thus present a technological solution and solve a technological problem of how to communicate among extended arrangements of power controllers and LED light strings in which not all of the power controllers are within wireless range of a single power controller or hand held device.

For example, multiple LED light strings may be arranged on trees on two sides of the street, or on four facades of a building. Each LED light string of the LED light string system can be expanded and combined freely according to use requirements, and can also be arranged freely. In one embodiment, after the LED light strings are arranged in a space (e.g., a lighting display, attached to one or more structures), or alternatively prior to arranging LED light strings but with knowledge aforethought of placement, a unique physical address is input to each power controller 1. In another embodiment, the unique physical addresses are input to the power controllers 1, at time of manufacture. In some embodiments, as further described below, multiple power controllers 1 can be grouped together as a virtual group power controller 63, through use of the physical addresses 62.

To facilitate input, a handheld device can be used to input the physical address through the wireless receiving and transmitting module 12, an input interface can be arranged in the power controller 1 to input the physical address, or the physical address can be input by means of button(s) according to an internal program. Further mechanisms and techniques for user input of physical address are readily devised, for example switches, touchscreen, jumpers, connector, cable, etc. With reference to FIGS. 1A, 1E and 6, in some embodiments a multilayer nested unique physical address, e.g., physical address 62, is stored in the memory 14, and the power controllers 1 are used for receiving broadcast packets, storing the broadcast packets in the corresponding buffers 13, and forwarding the broadcast packets by broadcasting within a set time.

Figure 7:
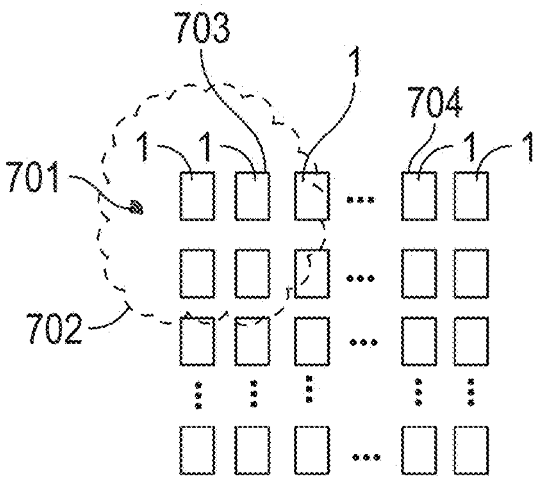
FIGS. 7-10 illustrate a scenario of wireless communication among power controllers of an LED light string system such as illustrated in FIG. 6.

FIGS. 7-10 illustrate a scenario of wireless communication among power controllers 1 of an LED light string system such as illustrated in FIG. 6. In various embodiments, to initiate a control broadcast, a handheld device 100 such as a mobile phone is used as a signal source 701, or a power controller 1 is used as a signal source 701. Using such signal source 701, a broadcast packet 17 (e.g., see FIG. 1E) is transmitted by a wireless transmission module of the signal source, and a subset 702 of the power controllers 1 in the LED light string system in FIG. 7 is within the broadcasting range of the signal source 701. That is, other power controllers 1 outside of the subset 702 are not within the broadcasting range of the signal source 701. The broadcast data packet 17 includes identifier bit(s) 174, a target address 175, a function instruction 176A and an LED light string control instruction 176B, in some embodiments.

For a step of signal source broadcasting, the wireless receiving and transmitting modules 12 of all power controllers 1 in the subset 702 within the broadcasting range of the signal source 701 receives the broadcast packet 17 containing the identifier bit(s) 174 transmitted by the signal source 701. These power controllers 1 in the subset 702 store the broadcast packet 17 in the corresponding buffers 13. Meanwhile, power controllers 1 out of the broadcasting range of the signal source 701, i.e., outside of the subset 702, are in a standby state. Under the presumably rare condition that all of the power controllers 1 cannot correctly receive the broadcast packet due to the presence of interference or other factors, they are in the standby state.

For a step of broadcasting again, which may be termed forwarding, repeating, or repeater forwarding, each power controller 1 receiving the broadcast packet 17 forwards the broadcast packet 17, subject to constraints. Specifically, in one embodiment, each power controller 1 receiving the broadcast packet takes the broadcast packet 17 stored in the buffer 13, and a previous received broadcast packet as two latest received broadcast packets 17. Power controllers 1 which receive the broadcast packet 17 for the first time (i.e., which have no prior, recent receipt of the identical broadcast packet 17), forward the broadcast packet 17 by broadcasting promptly, within less than a preset time. For example, the preset time could be 0.5 seconds, and the forwarding by a given power controller 1 receiving the broadcast packet 17 for the first time occurs in less than 0.5 seconds. The preset time may also be used for determining recency, and a power controller 1 receiving a broadcast packet 17 at a time interval greater than the preset time from any previous receipt of a broadcast packet will forward the recently received broadcast packet.

Figure 8:
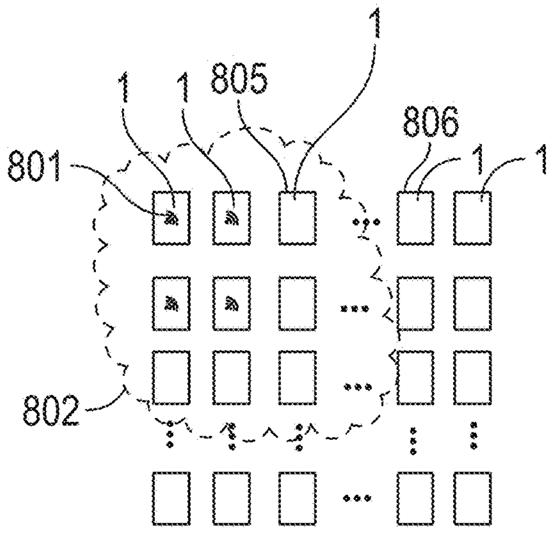

Continuing with reference to FIG. 7, because there are multiple power controllers 1 in the subset 702 within the broadcasting range of the signal source 701, for example four power controllers 1 including in-range controller 703, these power controllers 1 forward the broadcast packet and are thus formed as new signal sources 801 as shown in FIG. 8.

With reference to FIG. 8, because these power controllers 1 that have formed new signal sources 801 are arranged dispersedly, the broadcasting range defined by the new signal sources 801 is expanded and can cover not only these power controllers 1 in the previous subset 702 but also part of the power controllers 1 in the standby state, including in-range controller 805, all in the next subset 802 of power controllers 1.

Figure 9:
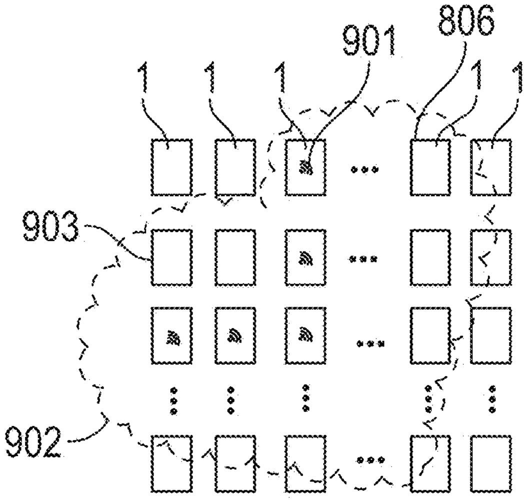

These power controllers 1 in the next subset 802 that are in range and in the standby state in FIG. 8, including in-range controller 805, will similarly have received the broadcast packet 17 for the first time and forward the broadcast packet 17, and form as new signal sources 901 as shown in FIG. 9. Meanwhile, those power controllers 1 that have formed signal sources 801 in FIG. 8 will be receiving the same broadcast packet 17 in less than the preset time from other power controllers 1 that have formed signal sources 801, and/or from the new signal sources 901, and they will determine to stop repeating, i.e. stop transmitting the broadcast packet and return to the standby state. Specifically, a power controller 1 that receives two latest identical broadcast packets and determines an interval between the reception times of the broadcast packets is less than the preset time, e.g., 0.5 seconds, will stop processing and not forward the broadcast packet anymore.

Figure 10:
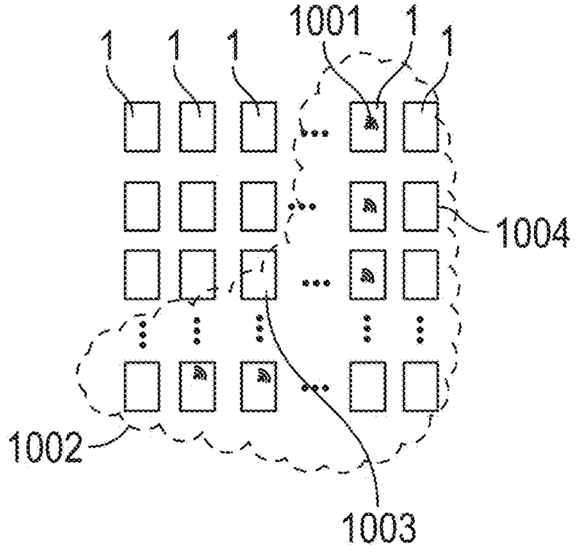

These processes act similarly in the transition between FIG. 9 and FIG. 10, with the power controllers 1 that have formed new signal sources 901 sending the broadcast packet 17, and in-range power controllers including power controller 806 (in FIG. 9) receiving and forwarding the broadcast packet 17 and forming as new signal sources 1001 (in FIG. 10). Meanwhile, those power controllers 1 that have formed new signal sources 901 will similarly receive two latest identical broadcast packets within less than the preset time and will stop processing and not forward broadcast packets anymore.

In FIG. 10, those power controllers 1 that are now in range, including in range controller 1004, will receive the broadcast packet 17, and soon receive two latest identical broadcast packets within less than the preset time and stop processing and not forward broadcast packets anymore. Reviewing the sequence from FIG. 7 to FIG. 8, to FIG. 9, and to FIG. 10, it is seen that the forming of new signal sources and forwarding of the broadcast packet progresses through all of the power controllers 1, with each power controller 1 stopping such forwarding upon receipt of a second, identical broadcast packet within less than the preset time.

This distributed process practiced across the group of power controllers 1 makes for an efficient, rapid, reliable transfer (e.g., broadcast, transmission, forwarding) of target address 175, function instruction 176A and LED string control instruction 176B to all the power controllers 1, and provides a self-regulated mechanism for power controllers 1 forming signal sources for forwarding, and then ceasing the forwarding and putting each of the power controllers 1 into a standby state, awaiting the next control operation. In some embodiments, the preset time can be set to other intervals, such as 0.4 seconds or 0.6 seconds, or may be variable, or user settable.

Referring back to FIG. 6, and also FIG. 1E, in one embodiment there is a step of addressing-based collaborative control, which may be applied across the sequence with forwarding and standby as illustrated in FIGS. 7-10, and may also be applied in groupings where all of the power controllers 1 are in range with an originating handheld device 100 or power controller 1. Addressing-based collaborative control makes use of specific addresses, to group power controllers 1 in a virtual group power controller 63, which is useful in some types of lighting displays, lighting effects and synchronization thereof.

For addressing-based collaborative control, all of the power controllers 1 receive the broadcast packet 17, which may be stored in the corresponding buffers 13. The power controllers 1 perform an addressing operation, and all of the power controllers 1 with the target address 175 in the broadcast packet 17 matching their own physical addresses 62 analyze the broadcast packet and control corresponding LED light strings according to configuration parameters in the broadcast packet 17.

More specifically, the physical address 62 of each power controller 1 is a multilayer nested address in some embodiments. The upper part of the physical address 62, which may be termed the high field of the multilayer nested address, is matched to the group address 177 in the data packet 17, for a group of power controllers. For example, looking at the high field of the physical address 62, it can be seen that the four power controllers 1 with physical addresses "0101", "0102", "0103" and "0104" all have in common the group address 177 of "01", and thus meet the addressing requirement for group addressing of power controllers 1 in the virtual group power controller 63. These grouped power controllers 1 can realize collaborative control of multiple LED light strings according to configuration parameters in one broadcast packet 17. Thus, an overall display effect, such as a waterfall effect, can be synchronized and realized across the virtual group power controller 63 and the multiple LED light strings 2 connected to and controlled by the virtual group power controller 63. Further, individual addressing is available, for example by addressing based on the complete multilayer nested address. For example, the power controller 1 with the address 62 of "0902" can be accurately selected. This capability, of both group addressing and individual addressing, supports expandability, various dynamic patterns, and point control of each LED light string and groups according to configuration parameters in the broadcast packet.

For synchronization, the four power controllers 1 that meet the addressing requirement as a whole to form the virtual group power controller 63, may each have a timer 16 (see FIG. 1A), and there is a need to coordinate or reset the timers 16 across the group. For example, it may be desired to have a coordinated lighting effect with synchronized timing across the virtual group power controller 63, for a more pleasing user experience of a lighting display. A technological problem to be solved is, local timers 16 may drift relative to one another, e.g., based on tolerances in crystal oscillators. To accomplish synchronization of the timers 16, in one embodiment, each power controller 1 in the virtual group power controller 63 executes the function instruction 176A and the LED light string control instruction 176B in the broadcast packet 17, and performs a count cycle operation with a set time. The power controller 1 that finishes the count cycle operation first in the virtual group power controller 63 will be reset, restart the cycle operation, and send a resetting synchronization configuration parameter message with a group address 177. All of the other power controllers 1 in the virtual group power controller 63 will receive the resetting synchronization configuration parameter message with the group address 177 that matches for them, and will then be reset to restart the cycle operation. In this way, all of the power controllers 1 in the virtual group power controller 63 are kept synchronous or synchronized, with timer drift minimized, thus improving the display timing stability.

For example, in the case of waterfall control which has a higher requirement for synchronization, parameters are configured in the broadcast packet. Waterfall control is performed on the four power controllers 1 with matching group address 177. These four power controllers 1, which form a virtual group power controller 63, execute the function instruction 176A and the LED light string control instruction 176B in the broadcast packet 17, synchronizing and/or starting timers 16. The timers 16 perform counting, count values are compared for sequencing lighting effects, and the light strings controlled by the power controllers 1 in the group are operated with synchronization of timing.

Figure 11A:
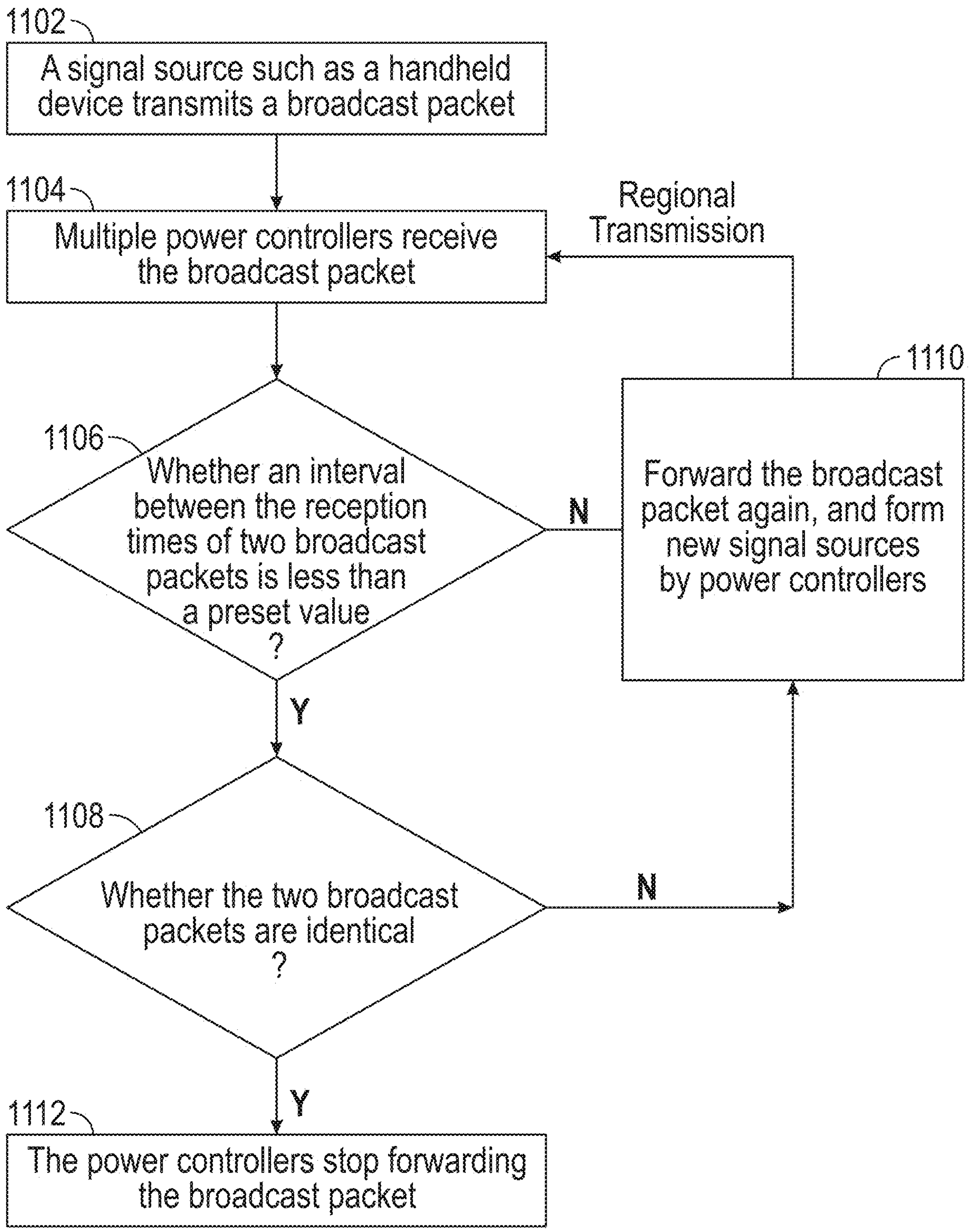
FIG. 11A illustrates a flow diagram in an embodiment of a technological method performed by an LED light string system with wireless communication among power controllers, which may be practiced by embodiments described herein and variations thereof.

FIG. 11A illustrates a flow diagram in an embodiment of a technological method performed by an LED light string system with wireless communication among power controllers, which may be practiced by embodiments described herein and variations thereof. Actions of the technological method provide for the functioning, or functional description, of multiple power controllers, for example embodiments of a lighting system with multiple power controllers and corresponding LED light strings.

In an action 1102, a signal source such as a handheld device transmits a broadcast packet. For example, see FIG. 1E, showing a data packet for an LED lighting system power controller.

In an action 1104, multiple power controllers receive the broadcast packet. For example, a given power controller may be in a standby state and receive the broadcast packet, not having received an identical packet recently, e.g., two identical packets within a preset interval. Alternatively, a given power controller may be in a signal source state, having forwarded a broadcast packet.

In a determination action 1106, it is determined by the power controller (i.e., each power controller receiving the broadcast packet) whether an interval between the reception times of the two most recent broadcast packets is less than a preset value, e.g., a preset interval. If the answer is no, the interval is not less than the preset value, a longer time interval than the preset interval has passed and the flow branches to the action 1110. If the answer is yes, the interval is less than the preset value, the interval between the reception times of the two most recent broadcast packets is less than the preset interval, and the flow branches to the determination action 1108.

In the action 1110, the power controllers participating in the determination action 1106 of "YES" are to forward the broadcast packet again, and form new signal sources by the power controllers.

In the determination action 1108, it is determined whether the two broadcast packets are identical. If the answer is no, flow branches to the action 1110. That is, the power controllers participating in the determination action 1106 of "NO" are to branch to the action 1110. If the answer is yes, flow branches to the action 1112. That is, the power controllers participating in the determination action 1106 of "YES" are to branch to the action 1112.

In the action 1112, the power controllers stop forwarding the broadcast packet. For example, such power controllers stop being signal sources and return to a standby state.

The flow diagram in FIG. 11A illustrates how power controllers determine whether or not to forward a broadcast packet, which controls packet flow and packet broadcast in a system that has multiple power controllers, such as power controllers in an LED lighting system. This is a distributed process, in which formation of signal sources, packet forwarding, and stopping of packet forwarding, alternatively forwarding state and standby state, are regulated in a distributed system, e.g., embodiments of a lighting system with multiple power controllers and LED light strings, to improve lighting system technology.

Figure 11B:
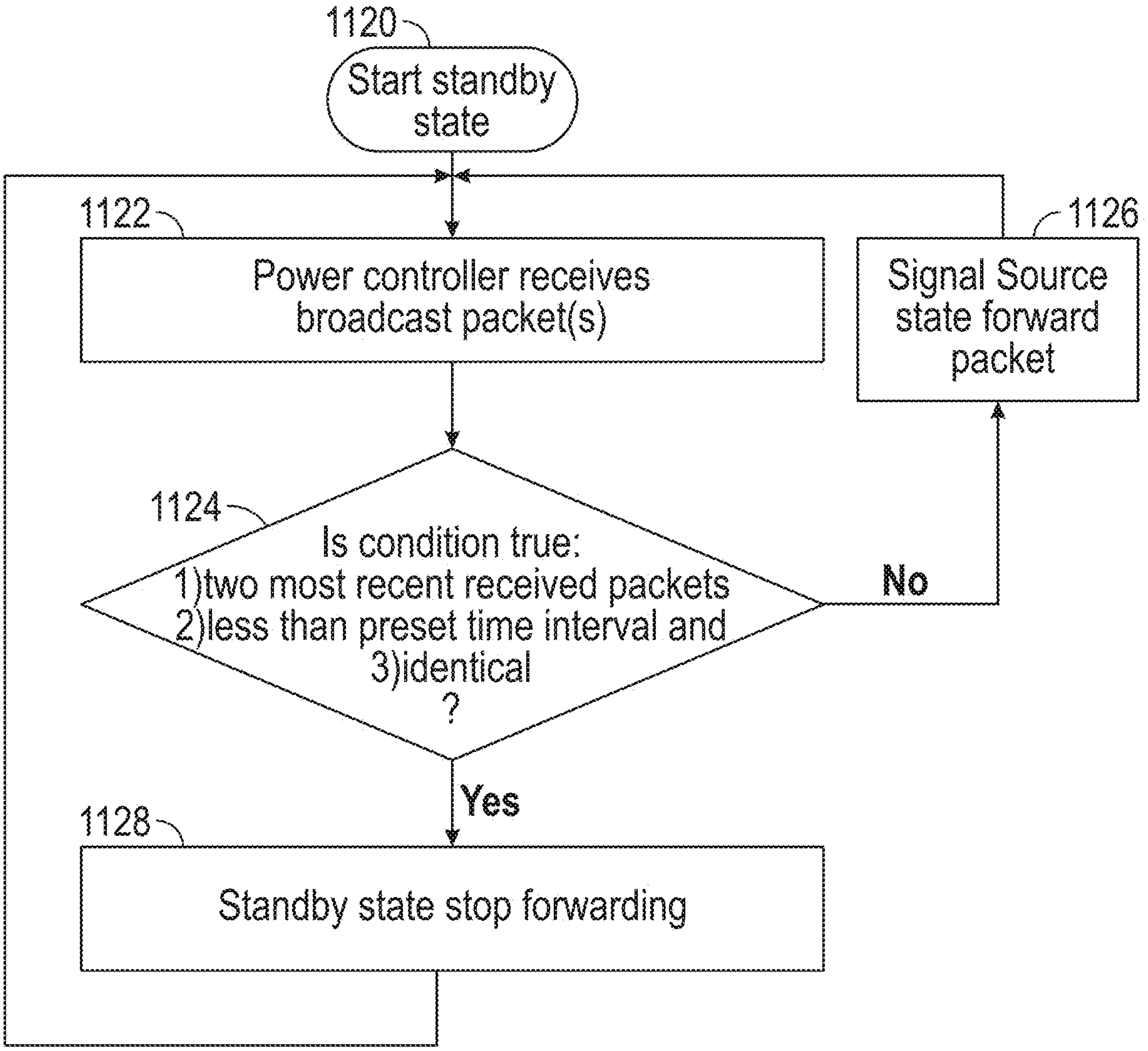
FIG. 11B illustrates a flow diagram in an embodiment of a technological method performed by a power controller in an LED light string system with wireless communication among power controllers, which may be practiced by embodiments described herein and variations thereof.

FIG. 11B illustrates a flow diagram in an embodiment of a technological method performed by a power controller in an LED light string system with wireless communication among power controllers, which may be practiced by embodiments described herein and variations thereof. Actions of the technological method provide for the functioning, or functional description, of each of multiple power controllers, for example, embodiments of a lighting system with multiple power controllers and corresponding LED light strings.

In an action 1120, a power controller, which may be one of many power controllers in a distributed system, starts in a standby state. For example, this may be upon power up, whereupon the power controller begins in a standby state, awaiting a broadcast packet, and with some default value set up for controller output, e.g., for control of an LED light string. Flow proceeds to the action 1122, which action may be returned to from other branches in the flow diagram.

In an action 1122, the power controller receives one or more broadcast packets. As noted above, when flow has arrived from the action 1120, the power controller is in the standby state. It is noted further, when flow arrives from other branches, the power controller may be in the standby state or may be in a signal source state. Flow proceeds from the action 1122, to the action 1124, with the power controller having received broadcast packet(s).

In a determination action 1124, the condition is tested. This is a compound condition, and variations of the flow are readily devised in which individual conditions are tested in various orders, or the compound condition is resolved with one, two, three, or more conditional tests, as readily devised by the person of skill in the art, e.g., for programming a controller. The determination action determines, is the condition true:

1) there are two most recent received packets;

2) less than a preset time interval has elapsed between two most recent received packets;

AND 3) two most recent received packets are identical.

For example, the preset time interval could be programmable, or fixed, and could be set for example at 0.5 second or other time interval.

If the condition is true, there are two most recent received packets, they have arrived and been received with less than the preset time interval elapsed between the two most recent received packets, and the two most recent received packets are identical, then flow branches to the action 1128.

If the condition is false, then flow branches to the action 1126. For example, a newly powered up power controller, which has been in the standby state and received a single packet, would resolve the condition as false, because there haven't been two most recent received packets, only just the one packet. Then the newly powered up power controller, which is in the standby state and received the single packet, would branch to the action 1126. For example, a power controller that is in either the standby state or the signal source state and receives multiple packets, but evaluates the two most recent received packets as arriving with greater than the preset time interval having elapsed between the two most recent received packets, or evaluates the two most recent received packets as not identical, would branch to the action 1126.

In the action 1126, arrived at where the condition tested in the action 1124 is evaluated as false (e.g., "NO"), the power controller is set to the signal source state and forwards the packet. Flow proceeds to the action 1122, where the power controller is available to receive broadcast packet(s).

In the action 1128, arrived at where the condition tested in the action 1124 is evaluated as true (e.g., YES), the power controller is set to the standby state and stops forwarding. That is, the power controller does not forward the most recent received packet. Flow proceeds to the action 1122, where the power controller is available to receive broadcast packet(s).

It is understood that the power controller, in each state may also perform actions for control of an LED light string, as described herein. Such control actions for an LED light string may relate to contents of the broadcast packet, state of the controller, timing, etc.

The flow diagram illustrates how each power controller determines whether or not to forward a broadcast packet, which controls packet flow and packet broadcast in a system that has multiple power controllers, such as power controllers in an LED lighting system. This is a distributed process, in which formation of signal sources, packet forwarding, and stopping of packet forwarding, with the power controller entering and exiting forwarding state and changing to standby state. Process is regulated in each power controller in a distributed system, e.g., embodiments of a lighting system with multiple power controllers and LED light strings, to improve lighting system technology.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A lighting control system, comprising:
- a plurality of LED strings;
- a plurality of power controllers for controlling the plurality of LED strings in accordance with broadcast packets communicated among the plurality of power controllers; and
- the plurality of power controllers configured to perform a technological method using wireless communication, comprising:
  - determining whether an interval between reception times of two received broadcast packets is less than a preset value;
  - determining whether the two received broadcast packets are identical;
  - determining to forward a broadcast packet and form a new signal source, when the interval between the reception times of the two received broadcast packets is not less than the preset value or the two received broadcast packets are not identical; and
  - determining to stop forwarding the broadcast packet, when the interval between the reception times of the two received broadcast packets is less than the preset value and the two received broadcast packets are identical.

2. The lighting control system of claim 1, wherein at least a subset of such broadcast packets each have a multilayer address, a function instruction and an LED string control instruction.

3. The lighting control system of claim 1, further comprising:
- the plurality of power controllers configured to receive a broadcast packet from a signal source of a handheld device comprising a mobile device, a handheld controller or a mobile phone.

4. The lighting control system of claim 1, further comprising:
- the plurality of power controllers configured to communicate via hyper wireless communication without handshake.

5. The lighting control system of claim 1, further comprising:
- the plurality of power controllers configured to control at least one virtual group power controller comprising multiple power controllers grouped together with addressing-based collaborative control.

6. The lighting control system of claim 1, further comprising:
- the plurality of power controllers configured to control the plurality of LED light strings with resetting synchronization for timers.

7. The lighting control system of claim 1, wherein each of the plurality of power controllers is configured to perform a technological method, comprising:
- receiving broadcast packets that include addressing and function instruction for LED string control;
- determining whether a condition is true that:
  - there is less than a preset time interval between two most recent received broadcast packets; and
  - the two most recent received broadcast packets are identical;
- forming a signal source state and forwarding the most recent received broadcast packet, when the condition is false;
- forming a standby state and stopping forwarding, when the condition is true; and
- controlling a respective one or more of the plurality of LED strings in accordance with such received broadcast packets.

8. A technological method, performed by a plurality of power controllers of a lighting control system using wireless communication and broadcast packets, comprising:

determining whether an interval between reception times of two received broadcast packets is less than a preset value;

determining whether the two received broadcast packets are identical;

determining to forward a broadcast packet and form a new signal source, when the interval between the reception times of the two received broadcast packets is not less than the preset value or the two received broadcast packets are not identical;

determining to stop forwarding the broadcast packet, when the interval between the reception times of the two received broadcast packets is less than the preset value and the two received broadcast packets are identical; and controlling a plurality of LED strings in accordance with the broadcast packets using the wireless communication in the lighting control system.

9. The technological method, performed by power controllers of a lighting control system using wireless communication and broadcast packets, of claim 8, wherein at least a subset of such broadcast packets each have a multilayer address, a function instruction and an LED string control instruction.

10. The technological method, performed by power controllers of a lighting control system using wireless communication and broadcast packets, of claim 8 further comprising:

receiving a broadcast packet from a signal source of a handheld device comprising a mobile device, a handheld controller or a mobile phone.

11. The technological method, performed by power controllers of a lighting control system using wireless communication and broadcast packets, of claim 8 further comprising:

using hyper wireless communication without handshake.

12. The technological method, performed by power controllers of a lighting control system using wireless communication and broadcast packets, of claim 8 further comprising:

using addressing-based collaborative control for at least one virtual group power controller comprising multiple power controllers grouped together.

13. The technological method, performed by power controllers of a lighting control system using wireless communication and broadcast packets, of claim 8 further comprising:

using resetting synchronization for timers in controlling the plurality of LED strings.

14. The technological method of claim 8, wherein each of the power controllers of the lighting control system using wireless communication and broadcast packets is configured to perform a technological method, comprising:

receiving broadcast packets that include addressing and function instruction for LED string control;

determining whether a condition is true that:

there is less than a preset time interval between two most recent received broadcast packets; and the two most recent received broadcast packets are identical;

forming a signal source state and forwarding the most recent received broadcast packet, when the condition is false;

forming a standby state and stopping forwarding, when the condition is true; and controlling a respective one or more of the plurality of LED strings in accordance with such received broadcast packets.

15. A tangible, non-transitory, computer-readable media having instructions thereupon which, when executed by a processor, cause the processor to perform a method comprising:

determining whether an interval between reception times of two received broadcast packets is less than a preset value, wherein the processor and such broadcast packets are in a lighting control system using wireless communication;

determining whether the two received broadcast packets are identical;

determining to forward a broadcast packet and form a new signal source, when the interval between the reception times of the two received broadcast packets is not less than the preset value or the two received broadcast packets are not identical;

determining to stop forwarding the broadcast packet, when the interval between the reception times of the two received broadcast packets is less than the preset value and the two received broadcast packets are identical; and controlling a plurality of LED strings in accordance with such broadcast packets.

16. The tangible, non-transitory, computer-readable media of claim 15, wherein at least a subset of such broadcast packets each have a multilayer address, a function instruction and an LED string control instruction.

17. The tangible, non-transitory, computer-readable media of claim 15, wherein the method further comprises:

using hyper wireless communication without handshake.

18. The tangible, non-transitory, computer-readable media of claim 15, wherein the method further comprises:

using addressing-based collaborative control for at least one virtual group power controller.

19. The tangible, non-transitory, computer-readable media of claim 15, wherein the method further comprises:

using resetting synchronization for timers in controlling the LED strings.

20. The tangible, non-transitory, computer-readable media of claim 15, wherein the method further comprises, for each of a plurality of power controllers of the lighting control system using wireless communication:

receiving broadcast packets that include addressing and function instruction for LED string control;

determining whether a condition is true that:

there is less than a preset time interval between two most recent received broadcast packets; and the two most recent received broadcast packets are identical;

forming a signal source state and forwarding the most recent received broadcast packet, when the condition is false;

forming a standby state and stopping forwarding, when the condition is true; and controlling a respective one or more of the plurality of LED strings in accordance with such received broadcast packets.

* * * * *